Figure 5:
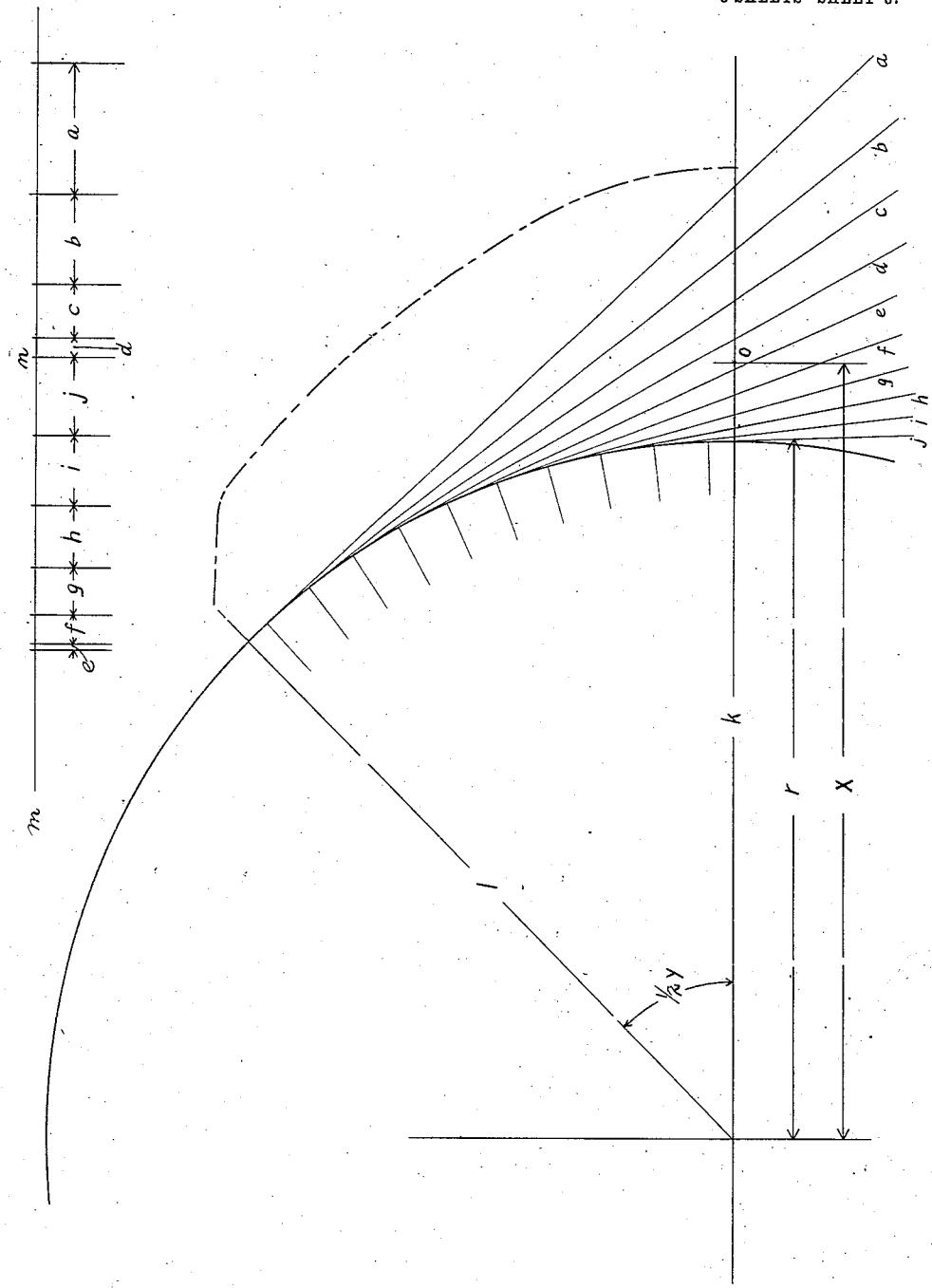

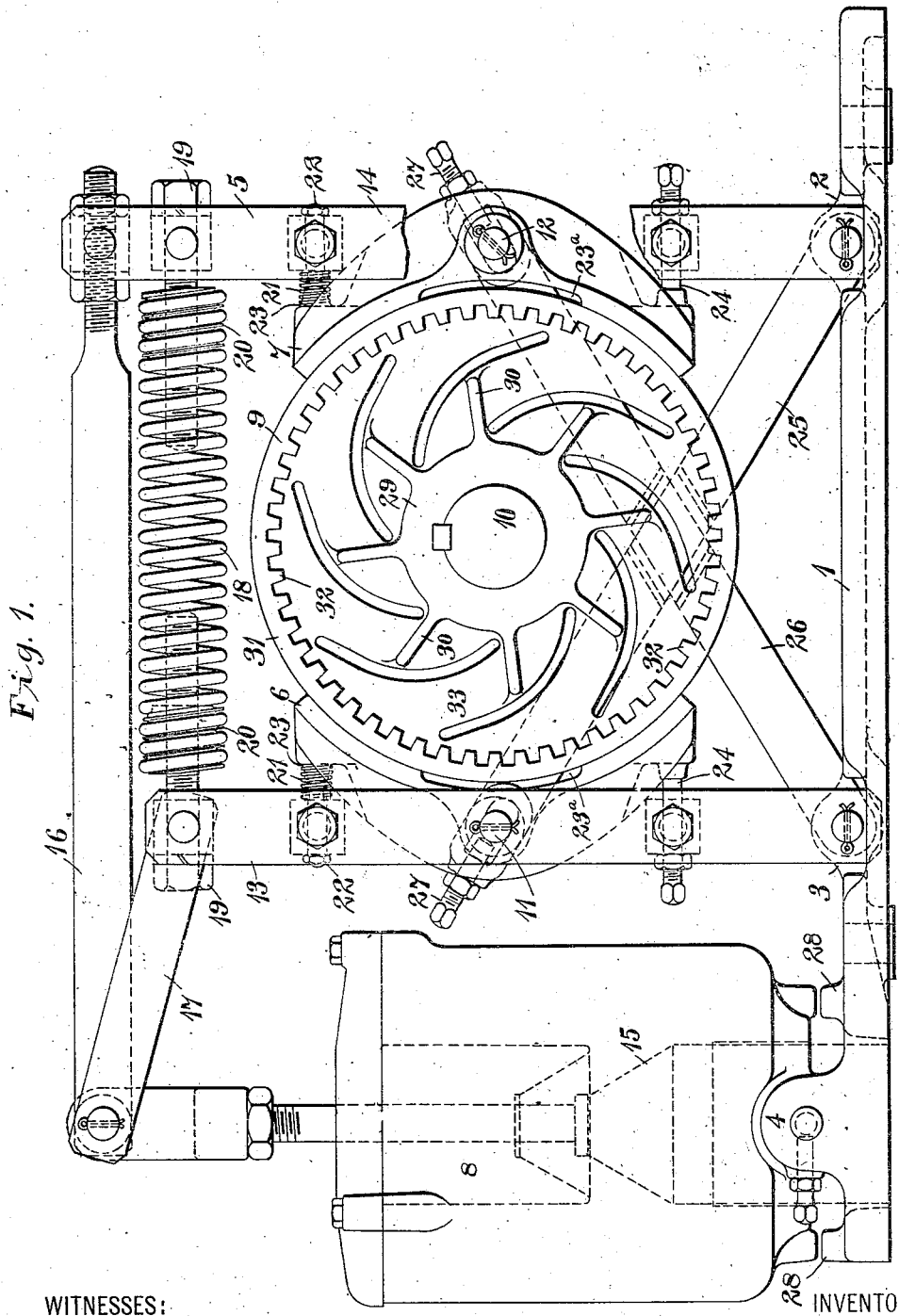

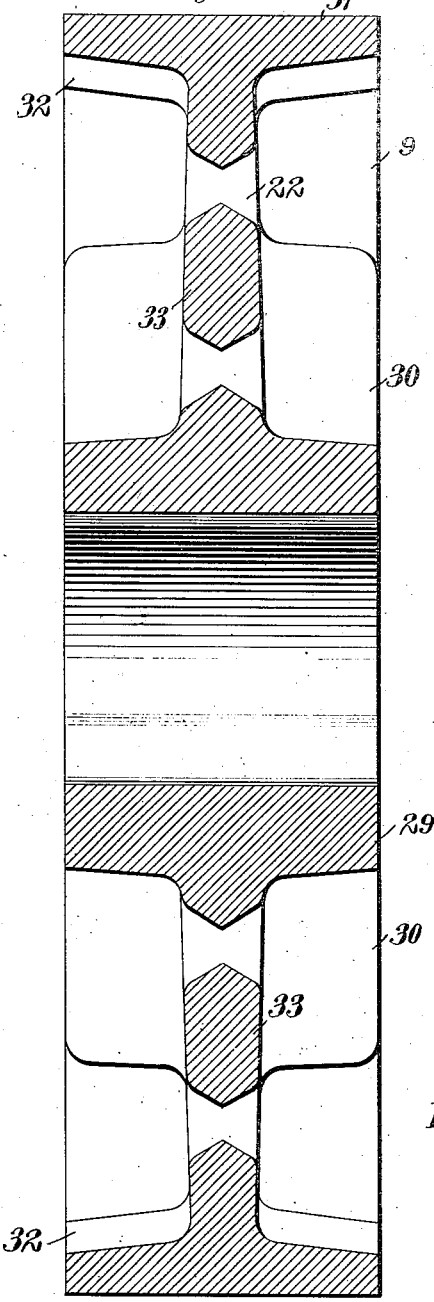
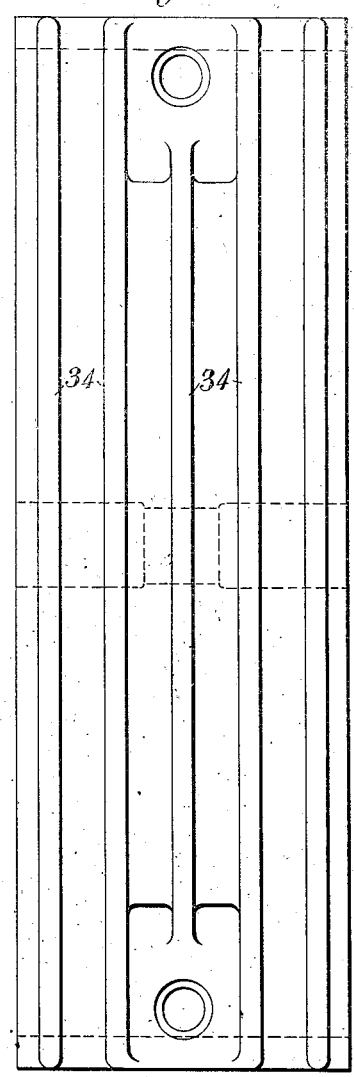
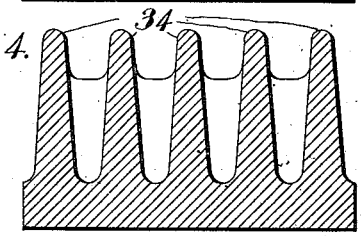

UNITED STATES PATENT OFFICE.

WILLIAM A. PARIS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

WHEEL-BRAKE.

951,146.      Specification of Letters Patent.     Patented Mar. 8, 1910.

Application filed March 3, 1906. Serial No. 304,094.

*To all whom it may concern:*

Be it known that I, WILLIAM A. PARIS, a citizen of the United States, and a resident of Edgewood Park, in the county of Allegheny and State of Pennsylvania, have invented a new and useful Improvement in Wheel-Brakes, of which the following is a specification.

My invention relates to wheel brakes and it has for its object to provide a wheel brake and engaging shoes therefor which may be readily formed of cast material and be specially adapted to withstand such strains as may be imposed by reason of wide variations in temperature and pressure.

A further object of my invention is to provide means for so suspending the engaging brake shoes that the resultant force due to friction will always pass through the point of suspension and, as the brake shoes are released from the surface of the wheel, the distances of separation of the two shoes therefrom will be equal and the engaging surfaces parallel.

In the operation of elevators, cranes, planers and other machines of similar character which must be stopped at frequent intervals and brought to rest suddenly, it has been usual to employ braking apparatus comprising one or more brake wheels, engaging shoes therefor and means for forcing these shoes against the outer cylindrical surfaces of the wheels. The frequent and prolonged operation of such devices in service causes a material rise in temperature in the rim of the brake wheel and in the shoes which engage this rim, and the strains occasioned by these temperatures have frequently been sufficient to rupture the rim. In some instances, brake wheels and shoes constructed of cast iron have become so hot that their contact surfaces deteriorated rapidly, and inflammable material in the vicinity was in danger of ignition.

Difficulty has heretofore been experienced in designing and constructing wheel brakes to avoid abnormal pressure between the extremities of the engaging arcs which caused the ends of the shoes to dig or plow into the surface of the wheel. Further difficulty has arisen, particularly with brakes which are adapted to be operated by electro-magnets, in that it was necessary to make the distance of travel considerable to insure disengagement of both shoes and to compensate for the wearing away of their surfaces.

According to my present invention I provide engaging shoes which are advantageously suspended and specially cooled, a wheel structure that is also provided with special radiating surfaces and is adapted to resist the usual strains which are imposed by high pressures and wide variations in temperature.

My invention is illustrated in the accompanying drawings in which—

Figure 1 is an elevation of a braking device, the several parts of which are constructed in accordance therewith; Figs. 2, 3 and 4, are detail views of the brake wheel and shoes which are shown in Fig. 1, and Fig. 5 is a diagrammatic view, illustrating a method of locating the proper point of suspension for a brake shoe of a given arc of engagement.

Referring to the drawings, the principal elements of the braking mechanism are a stationary base 1 having projections 2 and 3 to which a supporting frame 5 for brake shoes 6 and 7 is pivotally attached, and having also projections 4 upon which an electro-magnet 8 is pivotally mounted, and a brake wheel 9, which is rigidly attached to a rotatable shaft 10. The brake shoes 6 and 7 are mounted, respectively, upon shafts 11 and 12 which are supported by two pairs of upright bars 13 and 14 that constitute parts of the frame 5. The upper extremities of the bars 13 and 14 are connected to an armature 15 of the electro-magnet 8 by connecting links 16 and 17 and are connected to each other by a helical spring 18 which tends to hold the shoes 6 and 7 in engagement with the periphery of the wheel 9. The tension of this spring may be adjusted by bolts 19 which are screw-threaded to engage a pair of nuts 20 fixed to the extremities of the spring. The spring is made of considerable length so that, as the brake shoes wear, the spring tension may be substantially the same although its deflection is slightly reduced. The lengths of the links 16 and 17 and the arrangement of parts are such that an upward motion of the armature 15, which occurs when the electro-magent 8 is energized, separates the upper extremities of the bars 13 and 14 in opposition to the action of the spring 18 and thereby separates the brake shoes 6 and 7 from the wheel 9. Since the uprights 13 and 14 are pivotally mounted at their lower ends, the upper ends of the brake shoes tend to separate from the surface of the wheel more rapidly than their lower extremities. In order to counteract this tendency, relatively small springs 21 are interposed between adjustable stops 22 on the uprights and projections 23 on the shoes. The springs 21 cause the shoes to turn about the shafts 11 and 12 through small angles which are limited by stops 24, that are adapted to engage the lower extremities of the shoes, the stops and springs being adjusted to keep the engaging surfaces concentric when they are separated. The action of the electro-magnet is such that the frame 5 usually tends to swing away from the magnet as force is applied thereby and, consequently, inclined bars or strips 25 and 26 are pivoted upon the projections 2 and 3 and extend to the shafts 11 and 12 on the opposite sides of the wheel 9. The strips 25 and 26 are slotted near their outer extremities to engage the aforesaid shafts and are provided with adjustable stops 27. These stops are so adjusted as to limit the movement of the arms 13 and 14 and to equalize the distance between the two pairs of engaging surfaces when fully separated. The reaction of the frame 5 upon the operating magnet tends to rotate the magnet slightly so that it is desirable to pivotally mount it as shown in the drawings, the motion of the magnet being limited, in the construction illustrated, by stops 28. Since the frame ordinarily tends to move in one direction only, the bars or strips 25 may be omitted, if desired.

The brake wheel 9 comprises a hub member 29, radial ventilating ribs or vanes 30, a rim 31, the outer surface of which is substantially cylindrical, and the inner surface of which is provided with a plurality of corrugations or teeth 32 which materially increase the radiating surface presented to the air, and a plurality of spokes 33. The spokes 33 connect the aforesaid members 29 and 31 and are in the form of curved segments in order that a considerable expansion and contraction of the rim may take place without imposing severe strains upon the structure. The rim may be chilled in casting so that a very hard surface is presented to the shoes but, when so treated, it is more liable to rupture by severe strains.

The brake shoes are preferably constructed of soft cast iron to take the greater portion of the wear and are so mounted that they may be easily replaced, or they may be provided with detachable liners which are inexpensive and easily renewed. The shoes are rotatably mounted upon axes, the positions of which may be so located, by mathematical calculation, that the frictional forces exerted upon the shoes by the rotating brake wheel and tending to turn them upon their axes, neutralize each other. When this condition is fulfilled the shoes wear equally over their entire surfaces and the tendency, which would otherwise exist, for the points of the shoes to dig into the periphery of the wheel is avoided. If, with a given engaging arc, the point of support for a contact shoe is found to be so near the brake shoe that a shaft of suitable dimensions is prohibited, the point may be shifted away from the center of the wheel by either cutting away a portion of the material of the face of the shoe, midway of its ends or by increasing the total arc of contact. The recesses 23$^a$ shown in the drawings are illustrative of the former method. In order to strengthen the shoes and increase their radiating surface, I provide a plurality of substantially parallel and longitudinal back ribs 34, as shown in Figs. 3 and 4.

The suitable distance between the center of the wheel and the center of the shaft upon which a brake shoe is rotatably mounted may be determined by mathematical calculation or it may be very closely approximated diagrammatically, as illustrated in Fig. 5. Referring to this figure, the radius $k$ divides the engaging arc into equal parts of which it is only necessary to consider one portion as shown between the radii $k$ and $l$. The arc $\frac{1}{2}y$ is first divided into a number of equal parts and the force of friction which is equally distributed over the engaging surface is considered to be concentrated in equal quantities at the center of each small arc. These forces are tangent to the surface of the wheel and, since they are equal, it is only necessary to consider their moment about a point $o$, assumed to be the center of rotation for the shoe. This center will, of course, be located on the radial line K and if correctly chosen the sum of the perpendicular distances from the point to the several lines $a$, $b$, $c$, $d$, $e$, $f$, $g$, $h$, $i$ and $j$, which are tangent to the arc at the center of the divisions, will be zero when added algebraically. The distances are laid off on the line $m$ on either side of the cross line $n$ and are equal.

Variations in size and arrangement of parts may, of course, be made within the scope of my invention.

I claim as my invention:

1. A brake wheel comprising a hub having ventilating vanes projecting radially therefrom, a hardened rim having an outer cylindrical surface and a web joining the middle of the rim with the hub having narrow curved slots of radial direction, the entire inner surface of the rim at each side of the web being toothed or corrugated to increase heat radiation.

2. The combination with a brake wheel comprising a hub, a rim having an outer cylindrical surface and an inner corrugated surface to increase heat radiation, of engaging shoes the inner surfaces of which are concave and the backs of which are provided with longitudinal integral ribs.

3. The combination with a brake wheel comprising a hub, a rim having an outer cylindrical surface and an inner corrugated surface to promote heat radiation, and engaging shoes the inner surfaces of which are concave and the backs of which are provided with longitudinal ribs for stiffening the shoes and increasing the radiating surfaces, of means for forcing said shoes into engagement with the wheel.

4. The combination with a brake wheel comprising a hub, a rim having an outer cylindrical surface and an inner corrugated surface to promote heat radiation, and engaging shoes the inner surfaces of which are concave and the backs of which are provided with radiating ribs for stiffening the shoes and increasing their radiating surfaces, of a spring for forcing said shoes into engagement with the wheel, and electrical means for releasing the shoes therefrom.

5. The combination with a brake wheel, of coöperating shoes the middle face portions of which are cut away to provide concave engaging surfaces at the ends of the shoes only and the backs of which are corrugated to increase their radiating surfaces.

6. The combination with a brake wheel comprising a hub having ventilating vanes projecting radially therefrom, a rim having an outer cylindrical surface and an inner corrugated surface to promote heat radiation, and a plurality of curved spokes which connect said members and permit expansion and contraction to take place without rupturing the rim, of engaging shoes having concave engaging surfaces and recesses therein near the centers thereof.

7. The combination with a brake wheel, engaging shoes therefor, supporting bars for said shoes each of which is pivotally mounted upon a rigid body, of an adjustable stop that is attached to each of said bars and is adapted to engage the corresponding shoe near one end thereof and resilient means for holding the shoe in engagement with the stop as it is disengaged from the outer surface of the wheel.

8. The combination with a brake wheel, engaging shoes therefor, supporting bars for said shoes each of which is pivotally mounted upon a rigid body, of an adjustable stop that is attached to each of said bars and is adapted to engage the corresponding shoe near one end thereof and springs that are adapted to hold the shoes against the stops as the engaging friction surfaces are separated.

9. The combination with a brake wheel, a pair of opposite engaging shoes therefor, supporting frames for the shoes that are pivotally mounted upon a rigid body, and resilient means for holding the shoes in engagement with the surface of the wheel, of means for separating the shoes from the wheel, and inclined bars which limit the degrees of movement of said supporting frames.

10. The combination with a brake wheel, a pair of opposite engaging shoes therefor, supporting frames for the shoes that are pivotally mounted upon a rigid body, resilient means for holding the shoes in engagement with the surface of the wheel and means for separating the shoes from the wheel, of bars which limit the degree of separation of the engaging surfaces and means for keeping the contact surfaces parallel as they are separated.

11. The combination with a brake wheel, a pair of opposite engaging shoes therefor, supporting frames for the shoes that are pivotally mounted upon a rigid body, resilient means for holding the shoes in engagement with the surface of the wheel and means for separating the shoes from the wheel, of bars which limit the degree of movement of said supporting frames, adjustable stops that are attached to said frames and are adapted to engage the shoes, and means for holding the shoes in engagement with the stops as they are disengaged from the outer surface of the wheel.

12. The combination with a brake wheel, a pair of opposite engaging shoes therefor, supporting frames for the shoes that are pivotally mounted upon a rigid body, resilient means for holding the shoes in engagement with the surface of the wheel and means for separating the shoes from the wheel, of bars which limit the degree of movement of said supporting frames, and adjustable stops that are attached to said frames and are adapted to engage the shoes, and springs that are adapted to hold the shoes against the stops as the engaging friction surfaces are separated.

13. The combination with a brake wheel that comprises a hub member, a rim having an outer cylindrical surface and an inner surface which is corrugated to promote heat radiation and engaging shoes the inner surfaces of which are concave and the backs of which are provided with projections for radiation, supporting bars for said shoes that are pivotally mounted upon a rigid body and a spring which connects the free ends of said bars and holds the shoes in engagement with the wheel, of means for keeping the engaging surfaces parallel as they are separated.

14. The combination with a brake wheel that comprises a hub member, having ventilating vanes projecting radially therefrom, a rim having an outer cylindrical surface and an inner surface which is corrugated to promote heat radiation and a plurality of spokes which connect said members, the center lines of which lie in curved paths from the hub to the rim so that expansion and contraction of the rim may take place without rupture, engaging shoes having concave engaging surfaces and recesses therein near their centers, and supporting frames for the shoes that are pivotally mounted upon a rigid body, of resilient means for holding the shoes in engagement with the surface of the wheel, means for separating the shoes from the wheel, and bars which limit the degree of movement of said supporting frames.

In testimony whereof, I have hereunto subscribed my name this 24th day of February, 1906.

WILLIAM A. PARIS.

Witnesses:
 Ross W. Copeland,
 Birney Hines.